(12) United States Patent
Patel H B et al.

(10) Patent No.: US 12,729,766 B2
(45) Date of Patent: Sep. 8, 2026

(54) PROCESS CHAMBER VACUUM SEAL LEAKAGE REDUCTION

(71) Applicant: Applied Materials, Inc., Santa Clara, CA (US)

(72) Inventors: Shashidhara Patel H B, Bangalore (IN); Nagaraj Naik, Bangalore (IN); Muhannad Mustafa, Milpitas, CA (US); Bin Cao, Fremont, CA (US); Sanjeev Baluja, Campbell, CA (US); Aditya Chuttar, Sunnyvale, CA (US); Jae Hwa Park, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 414 days.

(21) Appl. No.: 18/209,762

(22) Filed: Jun. 14, 2023

(65) Prior Publication Data

US 2024/0344608 A1 Oct. 17, 2024

(30) Foreign Application Priority Data

Apr. 11, 2023 (IN) ............................ 202341026756

(51) Int. Cl.
*F16J 15/00* (2006.01)
*F16J 15/02* (2006.01)

(52) U.S. Cl.
CPC .......... *F16J 15/002* (2013.01); *F16J 15/024* (2013.01)

(58) Field of Classification Search
CPC .............................. F16J 15/002; F16J 15/004
See application file for complete search history.

(56) References Cited

U.S. PATENT DOCUMENTS 4,707,723 A 11/1987 Okamoto et al.
2002/0180159 A1* 12/2002 Nakamura .............. H01L 21/68 277/500
2006/0243269 A1 11/2006 Berenbak et al.
2011/0089497 A1 4/2011 Fukutome
2011/0303361 A1 12/2011 Ohmi et al.
2013/0284700 A1 10/2013 Nangoy et al.
2014/0154854 A1 6/2014 Wei et al.
2017/0137942 A1 5/2017 Kikuchi et al.
2022/0037500 A1 2/2022 Wang et al.
2022/0260156 A1 8/2022 Chilese et al.

FOREIGN PATENT DOCUMENTS

CN 109114222 A * 1/2019 ............. F16J 15/022
EP 2816235 A1 * 12/2014 ............... F16J 15/40
EP 2816235 B1 * 6/2019 .......... F16J 15/3484
JP 2001015440 A 1/2001

(Continued)

OTHER PUBLICATIONS

Machine Translation of CN109114222-A (Year: 2025).*

(Continued)

*Primary Examiner* — Gilbert Y Lee
(74) *Attorney, Agent, or Firm* — Servilla Whitney LLC

(57) ABSTRACT

Sealing bodies comprising a first body having a top surface and a bottom surface defining a thickness thereof. An inlet conduit and an outlet conduit are in fluid communication with one or more of the top surface, the bottom surface, or a top channel formed in the top surface or a bottom channel formed in the bottom surface.

20 Claims, 4 Drawing Sheets

(56) References Cited

FOREIGN PATENT DOCUMENTS

| | | | |
|---|---|---|---|
| JP | 2009200329 | A | 9/2009 |
| TW | 202207363 | A | 2/2022 |

OTHER PUBLICATIONS

PCT International Search Report and Written Opinion in PCT/US2024/023959 dated Jul. 22, 2024, 9 pages.

Google Patents Translation of JP2001015440 (retrieved Feb. 3, 2026),.

Machine Translation of CN10911422A Obtained from European Patent Office Website on Feb. 3, 2026.

* cited by examiner

PROCESS CHAMBER VACUUM SEAL LEAKAGE REDUCTION

CROSS-REFERENCE TO RELATED APPLICATIONS

This application claims priority to India Provisional Patent Application No. 202341026756, filed Apr. 11, 2023, the entire disclosure of which is hereby incorporated by reference herein.

TECHNICAL FIELD

Embodiments of the disclosure generally relate to apparatus and methods for reducing vacuum seal leakage. In particular, embodiments of the disclosure relate to apparatus and methods for reducing vacuum seal leakage in semiconductor manufacturing process chambers.

BACKGROUND

Reliably producing submicron and smaller features is one of the key requirements of very large scale integration (VLSI) and ultra large scale integration (ULSI) of semiconductor devices. However, with the continued miniaturization of circuit technology, the dimensions of the size and pitch of circuit features, such as interconnects, have placed additional demands on processing capabilities. The various semiconductor components (e.g., interconnects, vias, capacitors, transistors) require precise placement of high aspect ratio features. Reliable formation of these components is critical to further increases in device and density.

Additionally, the electronic device industry and the semiconductor industry continue to strive for larger production yields while increasing the uniformity of layers deposited on substrates having increasingly larger surface areas. These same factors in combination with new materials also provide higher integration of circuits per unit area on the substrate. The need for greater process control regarding layer characteristics increases with the movement to smaller device features.

During semiconductor manufacturing, oxygen leakage into the process chamber can cause oxide formation resulting in increases in electrical resistance at the wafer level function, reducing device efficiency. To avoid oxygen leakage, current process chamber designs use single and dual seals at the interfaces between process chamber components. Gas entry into the chamber can occur due to gas permeation of the O-rings. Vacuum connections are often used to remove entrapped and atmospheric gas entering the chamber at these interfaces. However, vacuum and O-ring interface effectiveness is reduced at higher temperatures as oxygen can more rapidly diffuse through the O-rings into the process chamber.

Accordingly, there is a need in the art for apparatus and methods to decrease gas leakage at the vacuum seals.

SUMMARY

One or more embodiments of the disclosure are directed to sealing bodies comprising a first body having a top surface and a bottom surface defining a thickness thereof. An inlet conduit is on a first portion of the first body. The inlet conduit is in fluid communication with one or more of the top surface or the bottom surface. An outlet conduit is on a second portion of the first body. The outlet conduit is in fluid communication with the same surface as the inlet conduit.

Additional embodiments of the disclosure are directed to sealing bodies comprising a first body having a top surface and a bottom surface defining a thickness thereof. An opening extends through the thickness of the first body. The first body has an outer diameter and the opening has an inner diameter. The outer diameter and inner diameter define a width of the first body. An inlet conduit is on a first portion of the first body. The inlet conduit is in fluid communication with one or more of a top channel formed in the top surface of the first body or a bottom channel formed in the bottom surface of the first body. An outlet conduit is on a second portion of the first body. The outlet conduit is in fluid communication with the same channel as the inlet conduit.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Before describing several exemplary embodiments of the disclosure, it is to be understood that the disclosure is not limited to the details of construction or process steps set forth in the following description. The disclosure is capable of other embodiments and of being practiced or being carried out in various ways.

As used in this specification and the appended claims, the term "substrate" refers to a surface, or portion of a surface, upon which a process acts. It will also be understood by those skilled in the art that reference to a substrate can also refer to only a portion of the substrate, unless the context clearly indicates otherwise. Additionally, reference to depositing on a substrate can mean both a bare substrate and a substrate with one or more films or features deposited or formed thereon.

A "substrate" as used herein, refers to any substrate or material surface formed on a substrate upon which film processing is performed during a fabrication process. For example, a substrate surface on which processing can be performed include materials such as silicon, silicon oxide, strained silicon, silicon on insulator (SOI), carbon doped silicon oxides, amorphous silicon, doped silicon, germanium, gallium arsenide, glass, sapphire, and any other materials such as metals, metal nitrides, metal alloys, and other conductive materials, depending on the application. Substrates include, without limitation, semiconductor wafers.

Substrates may be exposed to a pretreatment process to polish, etch, reduce, oxidize, hydroxylate, anneal, UV cure, e-beam cure and/or bake the substrate surface. In addition to film processing directly on the surface of the substrate itself, in the present disclosure, any of the film processing steps disclosed may also be performed on an underlayer formed on the substrate as disclosed in more detail below, and the term "substrate surface" is intended to include such underlayer as the context indicates. Thus, for example, where a film/layer or partial film/layer has been deposited onto a substrate surface, the exposed surface of the newly deposited film/layer becomes the substrate surface.

As used in this specification and appended claims, "substrate support" and "substrate support pedestal" may be used interchangeably.

As used in this specification and appended claims, use of relative terms like "above" and "below" should not be taken as limiting the scope of the disclosure to a physical orientation in space. Accordingly, use of relative terms should not be limited to the direction specified by gravity.

One or more embodiments of the disclosure advantageously provide methods and apparatus to reduce the oxygen leakage at the seals by introducing controlled amounts of a purge gas (e.g., $N_2$) in conjunction with the vacuum seal. Some embodiments of the disclosure provide designs that provide purge gas to restrict oxygen leakage near single seal locations (shallow areas) and between dual seals.

Figure 1:
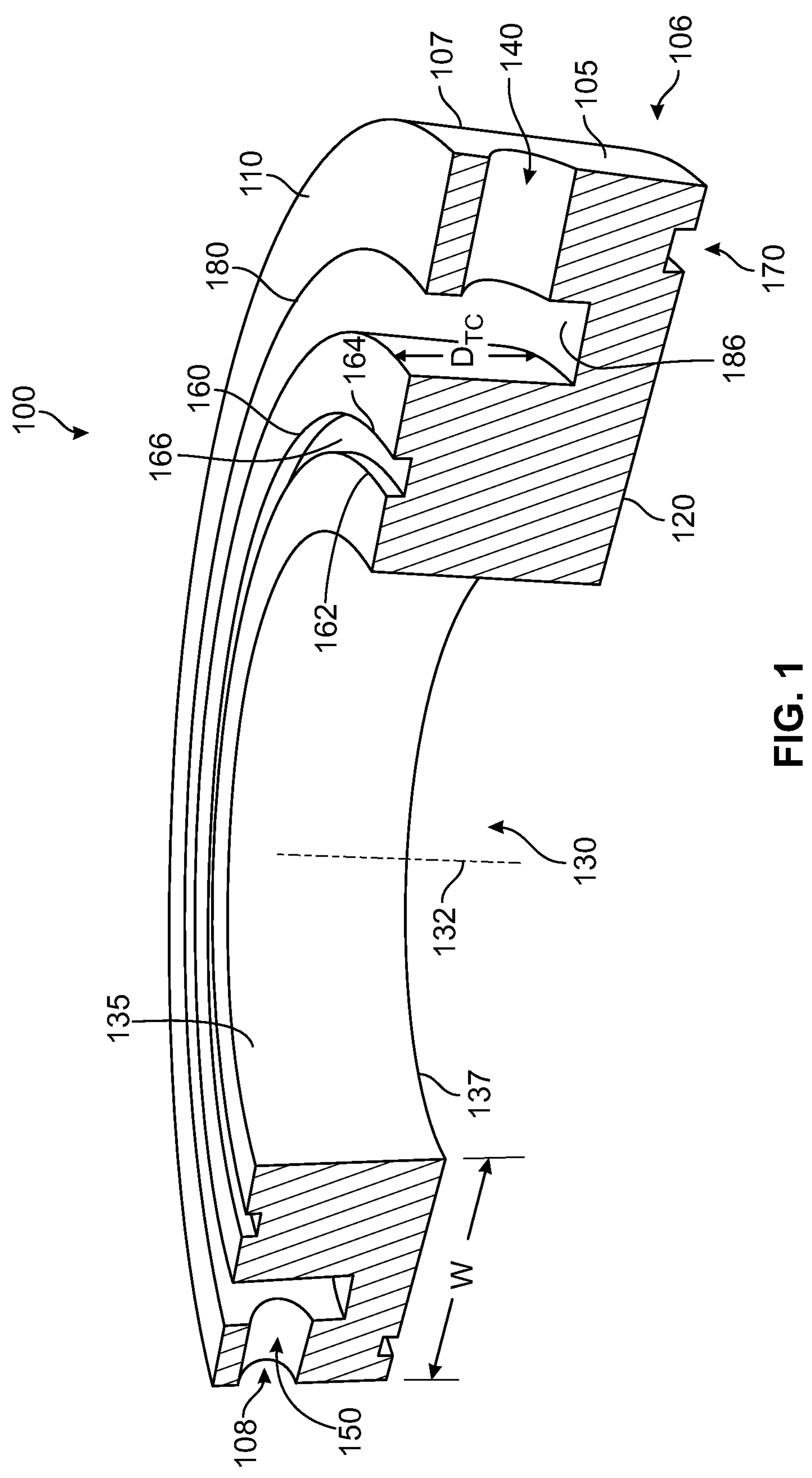
FIG. 1 illustrates a cross-sectional view of a sealing body according to one or more embodiment of the disclosure.

Referring to FIG. 1, one or more embodiments of the disclosure are directed to a sealing body 100. The sealing body 100 comprises a first body 105 that has a top surface 110 and a bottom surface 120. The top surface 110 and bottom surface 120 of the first body 105 define a thickness of the first body 105. The thickness of the first body 105 can be any suitable thickness depending on the application of the sealing body 100. The use of top (e.g., top surface 110) and bottom (e.g., bottom surface 120) is intended to differentiate between the various portions of the sealing body 100 and is not intended to limit the disclosure to any particular orientation of the components. The skilled artisan will easily recognize that the first body 105 can be inverted so that the top surface 110 is closer to the earth than the bottom surface 120 without deviating from the scope of the disclosure.

The first body 105 has an opening 130 extending through the thickness of the first body 105 so that is an aperture formed that allows a fluid to pass through the thickness of the first body 105. The opening 130 has an inner face 135 that creates an inner diameter of the opening 130. In the embodiments illustrated in the Figures, the opening 130 has an inner face 135 that is perpendicular to the top surface 110 and bottom surface 120 of the first body 105. In some embodiments, in which the opening 130 has an inner face 135 that has a slope that is different than perpendicular to the top surface 110 and bottom surface 120, the inner diameter is measured as the difference between the inner diameter of the inner face 135 at the top surface 110 and the inner diameter of the inner face 135 at the bottom surface 120.

The width of the first body 105 is defined as the difference between the outer diameter 107 of the first body 105 and the inner diameter 137 of the inner face 135 of opening 130. The width W of the first body 105 can be any suitable width depending on the application of the sealing body 100.

Figure 2:
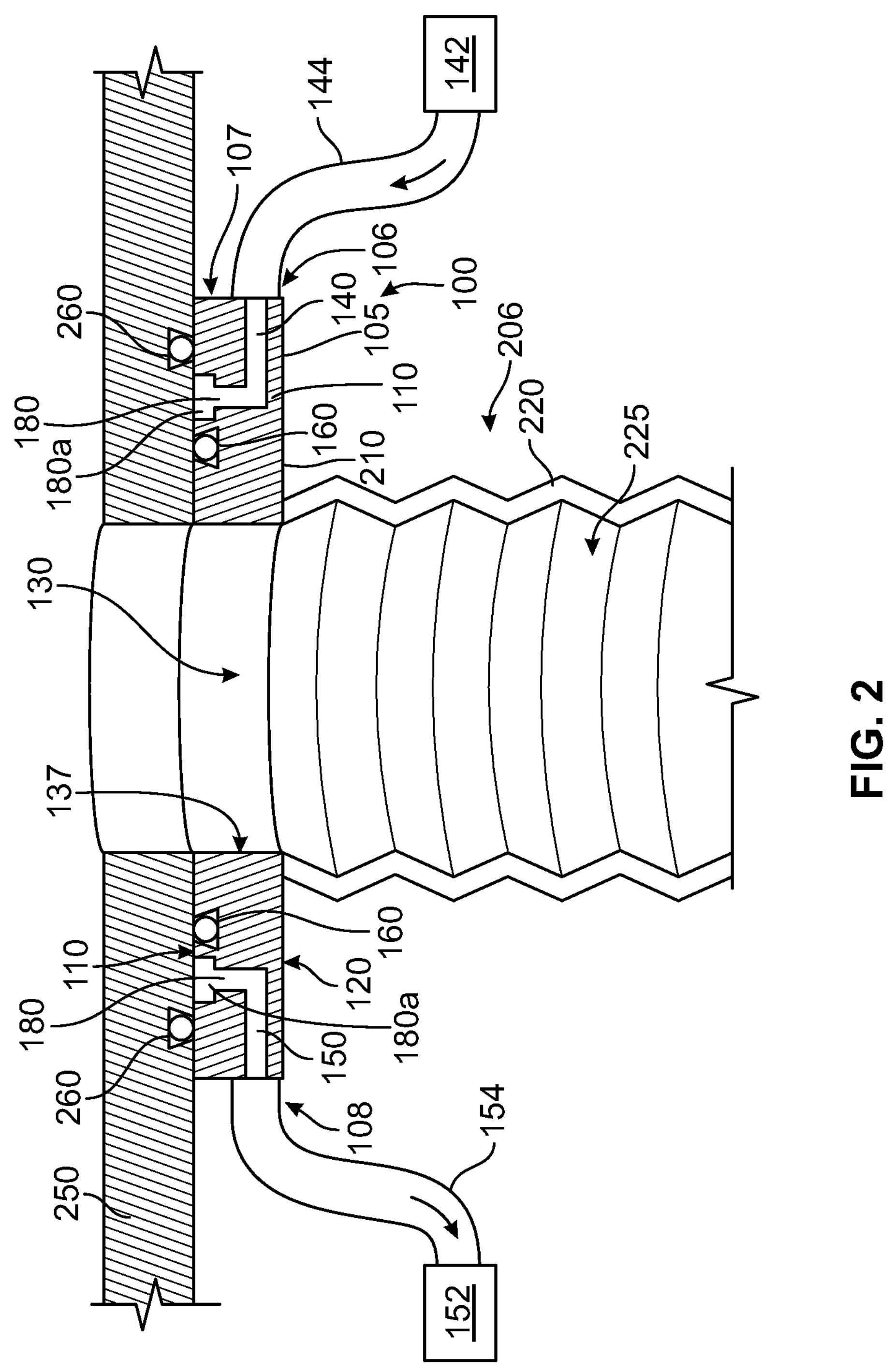
FIG. 2 illustrates a cross-sectional schematic view of a portion of a processing chamber with sealing body integral to a bellows according to one or more embodiment of the disclosure.
Figure 3:
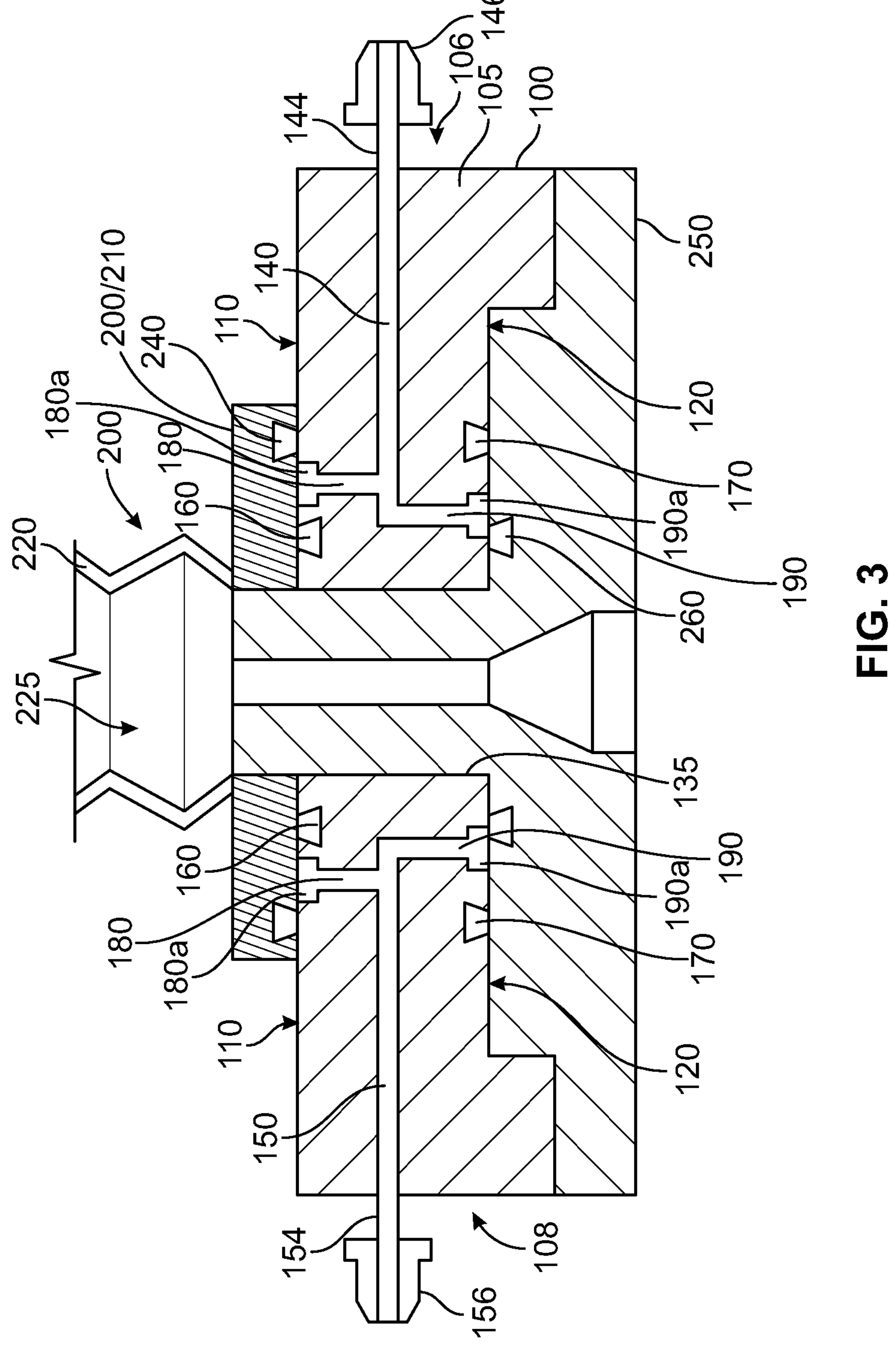
FIG. 3 illustrates a cross-sectional schematic view of a portion of a processing chamber with a sealing body between two components according to one or more embodiment of the disclosure.

The first body 105 includes an inlet conduit 140 on a first portion 106 of the first body 105. The inlet conduit 140 is in fluid communication with one or more of the top surface 110 or the bottom surface 120 of the first body 105. The inlet conduit 140 of some embodiments is configured to be connected to an inert gas source 142 through a purge gas line 144 (as shown in FIG. 2). In some embodiments, the purge gas line 144 has an end connector 146 (as shown in FIG. 3) that can be connected to an inert gas source 142 through any suitable complementary connector known to the skilled artisan. Suitable end connectors 146 includes, but are not limited to, tube fittings, torque fittings, and cone and thread fittings.

Referring again to FIG. 1, the first body 105 includes an outlet conduit 150 on a second portion 108 of the first body 105 opposite the first portion 106. The outlet conduit 150 is in fluid communication with one or more of the top surface 110 or the bottom surface 120 of the first body 105. In some embodiments, the outlet conduit 150 is in fluid communication with a same surface as the inlet conduit 140.

The outlet conduit 150 of some embodiments, is configured to be connected to a vacuum source 152 through vacuum line 154 (as shown in FIG. 2). In some embodiments, the vacuum line 154 has an end connector 156 (as shown in FIG. 3) that can be connected to a vacuum source 152 through any suitable complementary connector known to the skilled artisan. Suitable end connectors 156 include, but are not limited to, tube fittings, torque fittings, and cone and thread fittings.

Figure 4:
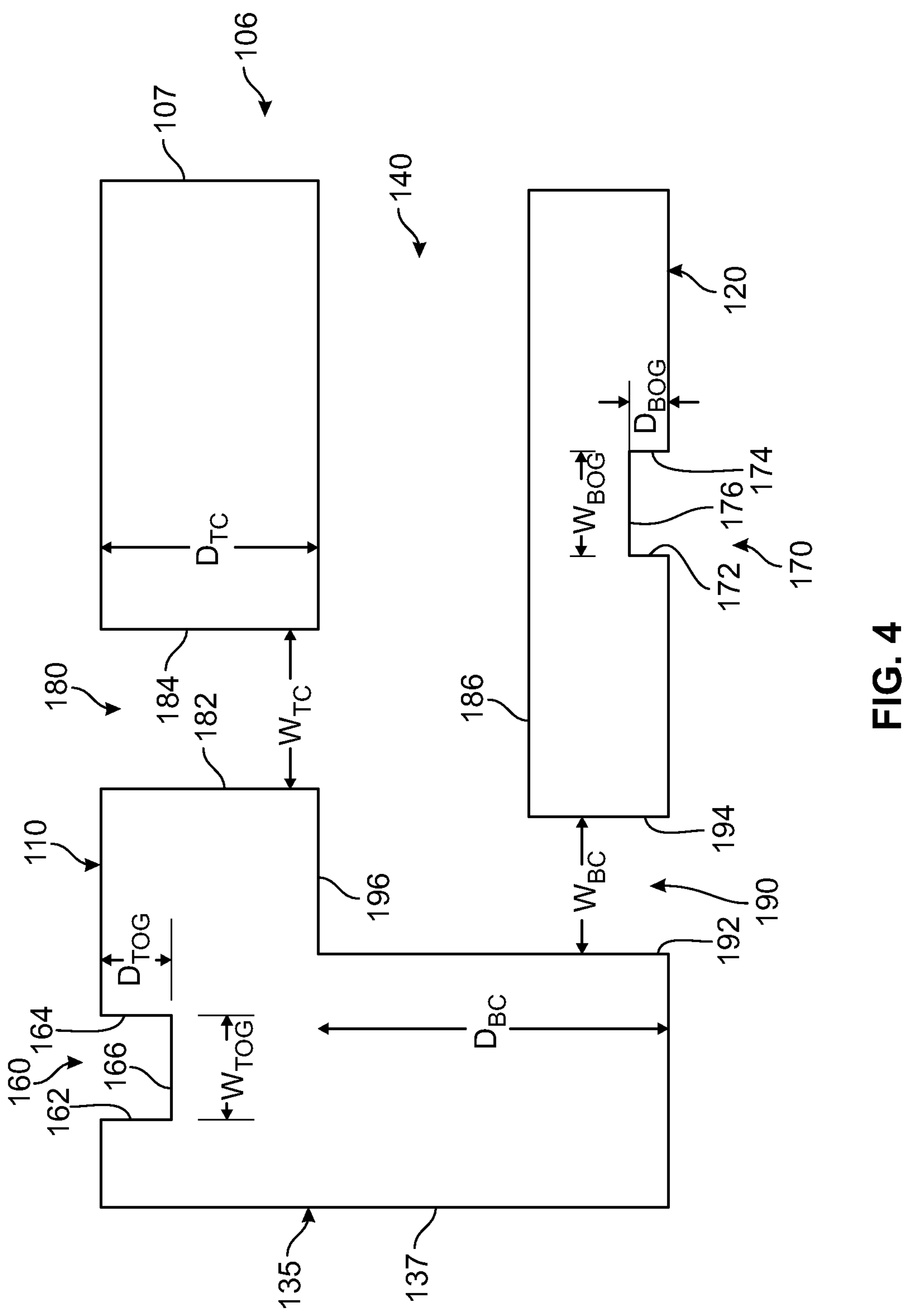
FIG. 4 illustrates a partial cross-sectional schematic view of a portion of a sealing body according to one or more embodiment of the disclosure.

Referring to FIGS. 1-4, some embodiments of the sealing body 100 include a top O-ring groove 160 formed in the top surface 110 of the first body 105. FIG. 4 shows an expanded view of the inlet conduit 140 portion of the first body 105 similar to that illustrated in FIG. 1 without cross-hatching for descriptive purposes. The left side of FIG. 4 is the inner face 135 of the opening 130 and the right side of FIG. 4 is the outer diameter 107 at the first portion 106 of the first body 105. The second portion 108 of the first body 105 is a mirror image of the embodiment illustrated in FIG. 4.

The top O-ring groove 160 has an inner diameter 162 and an outer diameter 164 defining a width WTOG of the top O-ring groove 160. The top O-ring groove 160 has a bottom face 166 defining a depth DTOG of the top O-ring groove 160 measured relative to the top surface 110 of the first body 105.

In some embodiments, as shown in FIGS. 1, 3 and 4, a bottom O-ring groove 170 is formed in the bottom surface 120 of the first body 105. The bottom O-ring groove 170 has an inner diameter 172 and an outer diameter 174 defining a width WBOG of the bottom O-ring groove 170. The bottom O-ring groove 170 has a top face 176 defining a depth DBOG of the bottom O-ring groove 170 measured relative to the bottom surface 120 of the first body 105.

In some embodiments, the top O-ring groove 160 and bottom O-ring groove 170 are located at different radii measured from a center 132 of the opening 130. The center 132 of the opening 130 is also referred to as the central axis of the opening 130. In some embodiments, the top O-ring groove 160 and bottom O-ring groove 170 have the same radii measured from the center 132 of the opening 130 for one or more of the inner diameter or outer diameter of the respective groove. In some embodiments, the top O-ring groove 160 is closer to the center 132 of the opening 130 than the bottom O-ring groove 170. Stated differently, in some embodiments, the inner diameter 162 of the top O-ring groove 160 is closer to the inner face 135 of the opening 130 than the inner diameter 172 of the bottom O-ring groove 170. In some embodiments, the outer diameter 164 of the top O-ring groove 160 is smaller than the inner diameter 172 of the bottom O-ring groove 170, as shown in FIG. 4. In some embodiments, the outer diameter 174 of the bottom O-ring groove 170 is smaller than the inner diameter 162 of the top O-ring groove 160.

The top O-ring groove 160 and bottom O-ring groove 170 illustrated in FIGS. 1 and 4 have sidewalls that are perpendicular to the top surface 110 and bottom surface 120, respectively. This is merely representative of one possible configuration and should not be taken as limiting the scope of the disclosure. The embodiments illustrated in FIGS. 2 and 3 show O-ring groove with sloping sidewalls. In embodiments of this sort, one or more of the inner diameter wall or the outer diameter wall of the O-ring groove can be sloped. In some embodiments, one or more of the O-ring groove walls are sloped so that the width of the O-ring groove at the respective surface of the first body 105 is smaller than the width of the O-ring groove at the bottom of the respective groove. In embodiments where one or more of the sidewalls are sloped, the width of the groove is measured as the average width of the groove measured along the depth of the groove.

In some embodiments, the first body 105 has a top channel 180 formed in the top surface 110 thereof. The top channel 180 is in fluid communication with the inlet conduit 140 and the outlet conduit 150. The top channel 180 has an inner diameter 182 and an outer diameter 184 defining a width $W_{TC}$ of the top channel 180. The skilled artisan will recognize that the width of the top channel 180 can increase at the surface to form a surface channel **180*a* with a larger width, as shown in FIGS. 2 and 3. In some embodiments, the width $W_{TC}$ of the top channel 180 is uniform along the depth $D_{TC}$ of the top channel 180. In some embodiments, the surface channel 180*a* has a width greater than or equal to 125%, 150% or 200% of the width $W_{TC}$ of the top channel 180**.

The top channel 180 has a bottom face 186 defining a depth $D_{TC}$ of the top channel 180 measured relative to the top surface 110 of the first body 105. In the embodiment illustrated in FIG. 1, the bottom face 186 of the top channel 180 is offset from the inlet conduit 140 and outlet conduit 150. In the embodiment illustrated in FIG. 4, the bottom face 186 is the inlet conduit 140 and outlet conduit 150. In some embodiments, the bottom face 186 of the top channel 180 is one or more of the inlet conduit 140 or outlet conduit 150. In some embodiments, the bottom face 186 of the top channel 180 is one of the inlet conduit 140 or outlet conduit 150 and is offset from the other of the inlet conduit 140 and outlet conduit 150.

In some embodiments, as shown in FIGS. 3 and 4, the first body 105 further comprises a bottom channel 190 formed in the bottom surface 120 thereof. The bottom channel 190 is in fluid communication with the inlet conduit 140 and the outlet conduit 150. The bottom channel 190 has an inner diameter 192 and an outer diameter 194 defining a width $W_{BC}$ of the bottom channel 190. The skilled artisan will recognize that the width $W_{BC}$ of the bottom channel 190 can increase at the surface to form a surface channel **190*a* with a larger width, as shown in FIGS. 2 and 3. In some embodiments, the width $W_{BC}$ of the bottom channel 190 is uniform along the depth $D_{BC}$ of the bottom channel 190. In some embodiments, the surface channel 190*a* has a width greater than or equal to 125%, 150% or 200% of the width $W_{BC}$ of the bottom channel 190**.

The bottom channel 190 has a bottom face 196 defining a depth $D_{BC}$ of the bottom channel 190 measured relative to the bottom surface 120 of the first body 105. In the illustrated embodiments, the bottom face 196 of the bottom channel 190 is the inlet conduit 140 or outlet conduit 150. In some embodiments, the bottom face 196 of the bottom channel 190 is one or more of the inlet conduit 140 or outlet conduit 150. In some embodiments, bottom face 196 of the bottom channel 190 is one of the inlet conduit 140 or outlet conduit 150 and is offset from the other of the inlet conduit 140 or outlet conduit 150.

In some embodiments, the top channel 180 and bottom channel 190 are offset at different radii relative to the center 132 of the opening 130. In some embodiments, the inner diameter 182 and outer diameter 184 of the top channel 180 are smaller than the inner diameter 192 and outer diameter 194 of the bottom channel 190. In some embodiments, the inner diameter 182 and 184 of the top channel 180 are larger than the inner diameter 192 and outer diameter 194 of the bottom channel 190. In some embodiments, the inner diameter 182 of the top channel 180 is larger than the outer diameter 194 of the bottom channel 190, as shown in FIGS. 3 and 4. In some embodiments, the inner diameter 192 of the bottom channel 190 is larger than the outer diameter 184 of the top channel 180.

In some embodiments, the top channel 180 and bottom channel 190 are centered at different radial locations between the outer diameter 164 of the top O-ring groove 160 and the inner diameter 172 of the bottom O-ring groove 170. As used in this manner, the center of the channel is average radial distance of the respective channel at the respective surface of the first body 105. In some embodiments, one or more of the top channel 180 or bottom channel 190 are centered between the top O-ring groove 160 and bottom O-ring groove 170.

Referring to FIG. 2, in some embodiments, the first body 105 of the sealing body 100 is part of an integrally formed flange 210 on a second body 200. For example, in FIG. 2, the first body 105 and second body 200 form a portion of a bellows 220. The skilled artisan will be familiar with a bellows 220 used to maintain a pressure seal between components. The opening 130 in the first body 105 is aligned with an openings 225 extending through the bellows 220. The first body 105 that is the integrally formed flange 210 of the second body 200 is connected a third body 250. The third body 250 is a different component than the first body 105 and second body 200 in which a seal between the first body 105 and the third body 250 is to be formed. For example, the third body 250 of some embodiments is a process chamber bottom wall and a seal is formed between the first body 105 which is the integrally formed flange 210 of the second body 200 which is the bellows 220. In the embodiment illustrated in FIG. 2, the inlet conduit 140 and outlet conduit 150 are in fluid communication with the top channel 180 which is positioned between the top O-ring groove 160 and the O-ring groove 260 of the third body 250. In the illustrated embodiment, the top O-ring groove 160 is closer to the opening 130 than the O-ring groove 260 of the third body 250. In some embodiments, the order of top O-ring groove 160 and O-ring groove 260 are reversed so that the O-ring groove 260 is closer to the opening 130 than the top O-ring groove 160 and the top channel 180 is radially positioned between the top O-ring groove 160 and O-ring groove 260.

In the embodiment illustrated in FIG. 3, the second body 200 is an integrally formed flange 210 of a bellows 220 and the first body 105 is connected to the second body 200. As shown, the first body 105 connects the second body 200 with the third body 250 to form a seal between. The top channel 180 of the first body 105 is radially positioned between the top O-ring groove 160 of the first body 105 and the O-ring groove 240 of the second body 200. The top O-ring groove 160 of the first body 105 is closer to the O-ring groove 240 of the second body 200. In some embodiments, the radial positions of the top O-ring groove 160 and O-ring groove 240 are reversed relative to the top channel 180 so that the O-ring groove 240 is closer to the opening 130 than the top O-ring groove 160. The third body 250 illustrated has an O-ring groove 260 adjacent the bottom surface 120 of the first body 105. The O-ring groove 260 is positioned radially closer to the opening 130 than the bottom O-ring groove 170 of the first body 105 and the bottom channel 190 is between the O-ring groove 260 and the bottom O-ring groove 170. In some embodiments, the O-ring groove 260 and bottom O-ring groove 170 are reversed relative to the bottom channel 190 so that the bottom O-ring groove 170 is closer to the opening 130 than the O-ring groove 260.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein has been described with reference to particular embodiments, those skilled in the art will understand that the embodiments described are merely illustrative of the principles and applications of the present disclosure. It will be apparent to those skilled in the art that various modifications and variations can be made to the method and apparatus of the present disclosure without departing from the spirit and scope of the disclosure. Thus, the present disclosure can include modifications and variations that are within the scope of the appended claims and their equivalents.

What is claimed is:

1. A semiconductor manufacturing process chamber sealing apparatus comprising:

a first body having a top surface and a bottom surface defining a thickness thereof, and an opening extending through the thickness of the first body, the first body having an outer diameter and the opening having an inner diameter, the outer diameter and the inner diameter defining a width of the first body;

a top O-ring groove formed in the top surface of the first body adjacent to a second body, the top O-ring groove having an inner diameter and an outer diameter defining a width of the top O-ring groove, and a bottom face defining a first depth of the top O-ring groove measured relative to the top surface of the first body;

a bottom O-ring groove formed in the bottom surface of the first body adjacent to a third body, the bottom O-ring groove having an inner diameter and an outer diameter defining a width of the bottom O-ring groove, and a top face defining a second depth the bottom O-ring groove measured relative to the bottom surface of the first body; and an inlet conduit on a first portion of the first body, the inlet conduit configured to be connected to an inert gas source and in fluid communication with one or more of the top surface or the bottom surface to introduce a controlled amount of purge gas; and an outlet conduit on a second portion of the first body opposite the first portion, the outlet conduit configured to be connected to a vacuum source and in fluid communication with a same surface as the inlet conduit, wherein the sealing apparatus reduces leakage of oxygen into a semiconductor manufacturing processing chamber.

2. The semiconductor manufacturing process chamber sealing apparatus of claim 1, wherein the inlet conduit is in fluid communication with the inert gas source.

3. The semiconductor manufacturing process chamber sealing apparatus of claim 2, wherein the first body is part of an integrally formed flange on the second body.

4. The semiconductor manufacturing process chamber sealing apparatus of claim 3, wherein the first body and the second body form a portion of a bellows.

5. The semiconductor manufacturing process chamber sealing apparatus of claim 2, wherein the inert gas source comprises $N_2$.

6. The semiconductor manufacturing process chamber sealing apparatus of claim 5, wherein the outlet conduit is in fluid communication with the vacuum source.

7. The semiconductor manufacturing process chamber sealing apparatus of claim 1, wherein the top O-ring groove and the bottom O-ring groove are located at different radii measured from a center of the opening.

8. The semiconductor manufacturing process chamber sealing apparatus of claim 7, wherein the outer diameter of the top O-ring groove is smaller than the inner diameter of the bottom O-ring groove.

9. The semiconductor manufacturing process chamber sealing apparatus of claim 7, further comprising a top channel formed in the top surface of the first body, the top channel in fluid communication with the inlet conduit and the outlet conduit, the top channel having an inner diameter and an outer diameter defining a width of the top channel, and a bottom face defining a depth of the top channel measured relative to the top surface of the first body.

10. The semiconductor manufacturing process chamber sealing apparatus of claim 9, further comprising a bottom channel formed in the bottom surface of the first body, the bottom channel in fluid communication with the inlet conduit and the outlet conduit, the bottom channel having an inner diameter and an outer diameter defining a width of the bottom channel, and a top face defining a depth of the bottom channel measured relative to the bottom surface of the first body.

11. The semiconductor manufacturing process chamber sealing apparatus of claim 10, wherein the top channel and the bottom channel are offset at different radii relative to the center of the opening.

12. The semiconductor manufacturing process chamber sealing apparatus of claim 10, wherein the width of the bottom channel increases at the bottom surface of the first body to form a bottom surface channel with a larger width than the width of the bottom channel.

13. The semiconductor manufacturing process chamber sealing apparatus of claim 9, wherein the width of the top channel increases at the top surface of the first body to form a top surface channel with a larger width than the top channel.

14. An apparatus configured to reduce vacuum seal leakage between components in a semiconductor processing chamber, the apparatus comprising:

a first body having a a top surface, a bottom surface, an opening through the top and bottom surfaces, a top O-ring groove formed in the top surface of the first body, and a bottom O-ring groove formed in the bottom surface a second body forming a portion of a bellows having an opening aligned with the opening in the first body;

a third body comprising a bottom wall of the semiconductor processing chamber;

a top surface channel in fluid communication with each of the top O-ring groove, a gas inlet, a vacuum line and a gas outlet; and a bottom surface channel in fluid communication with each of the bottom O-ring groove, the gas inlet, the vacuum line, the gas outlet and the top surface channel, wherein a controlled amount of purge gas flowed through the gas inlet to the vacuum line reduces leakage of oxygen into the semiconductor processing chamber.

15. The apparatus of claim 14, wherein the first body is a flange on the second body.

16. The apparatus of claim 14, wherein the top surface channel is in fluid communication with a top channel in fluid communication with the gas inlet and the vacuum line, and wherein the bottom surface channel is in fluid communication with a bottom channel in fluid communication with the gas inlet and the vacuum line.

17. The apparatus of claim 16, wherein the top surface channel has a width that is larger than a width of the top channel.

18. The apparatus of claim 16, wherein the bottom surface channel has a width that is larger than a width of the bottom channel.

19. The apparatus of claim 14, wherein the gas inlet is in fluid communication with an inert gas source.

20. The apparatus of claim 19, wherein the inert gas is $N_2$.

* * * * *